United States Patent
Piippo et al.

(10) Patent No.: US 9,525,964 B2
(45) Date of Patent: Dec. 20, 2016

(54) METHODS, APPARATUSES, AND COMPUTER-READABLE STORAGE MEDIA FOR PROVIDING INTERACTIVE NAVIGATIONAL ASSISTANCE USING MOVABLE GUIDANCE MARKERS

(75) Inventors: Petri Piippo, Lempäälä (FI); Sampo T. Vaittinen, Helsinki (FI); Juha H. Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 888 days.

(21) Appl. No.: 13/364,483

(22) Filed: Feb. 2, 2012

(65) Prior Publication Data

US 2013/0201214 A1 Aug. 8, 2013

(51) Int. Cl.
*H04W 4/02* (2009.01)
*G06F 3/14* (2006.01)
*G01C 21/36* (2006.01)

(52) U.S. Cl.
CPC ........... *H04W 4/02* (2013.01); *G06F 3/14* (2013.01); *G06F 3/1423* (2013.01); *G06F 3/1454* (2013.01); *G01C 21/3632* (2013.01); *G01C 21/3647* (2013.01); *G09G 2340/12* (2013.01); *G09G 2340/145* (2013.01); *H04W 4/028* (2013.01)

(58) Field of Classification Search
CPC .......... G06F 3/011; G06F 3/013; G06F 3/005; G06F 3/017; H04W 64/00; H04W 4/025; H04W 4/02; H04W 24/00; G06K 9/00342; G06K 9/00791; G06K 7/10009; G06K 9/00

USPC ......................................................... 345/633
See application file for complete search history.

(56) References Cited

U.S. PATENT DOCUMENTS

| | | | |
|---|---|---|---|
| 2007/0067104 A1 | 3/2007 | Mays | 701/211 |
| 2009/0240431 A1 | 9/2009 | Chau et al. | 701/208 |
| 2010/0325563 A1 | 12/2010 | Goldthwaite et al. | 715/757 |
| 2011/0164163 A1 | 7/2011 | Bilbrey et al. | 345/333 |
| 2012/0249586 A1* | 10/2012 | Wither | H04N 1/00323 345/633 |
| 2012/0299962 A1* | 11/2012 | White et al. | 345/633 |

(Continued)

FOREIGN PATENT DOCUMENTS

| | | |
|---|---|---|
| CN | 101109643 A | 1/2008 |
| CN | 101640002 A | 2/2010 |

(Continued)

*Primary Examiner* — Maurice L McDowell, Jr.
(74) *Attorney, Agent, or Firm* — Harrington & Smith

(57) ABSTRACT

Methods, apparatuses and computer-readable storage media for displaying at a first user equipment a first marker a location wherein the location is defined remotely at a second user equipment; displaying at the second user equipment a current geographic location and a current vantage point for the first user equipment; displaying at the second user equipment a second marker; accepting at the second user equipment an input for adjusting the second marker from a first position to a second position, wherein the second position is indicative of a target geographic location in a first virtual view of the current geographic location of the first user equipment as displayed on the second user equipment; and in response to the adjusting, displaying at the first user equipment the first marker at the target geographic location in a second virtual view of the current geographic location.

30 Claims, 11 Drawing Sheets

(56) References Cited

U.S. PATENT DOCUMENTS

2013/0143587 A1\* 6/2013 Williams .............. H04W 4/023
  455/456.1

FOREIGN PATENT DOCUMENTS

| CN | 102176770 A | 9/2011 |
|----|----|----|
| EP | 1435737 A1 | 7/2004 |
| EP | 1614997 A1 | 1/2006 |
| WO | WO-2011077859 A1 | 6/2011 |
| WO | WO-2011/144797 A1 | 11/2011 |
| WO | WO-2012164155 A1 | 12/2012 |

\* cited by examiner

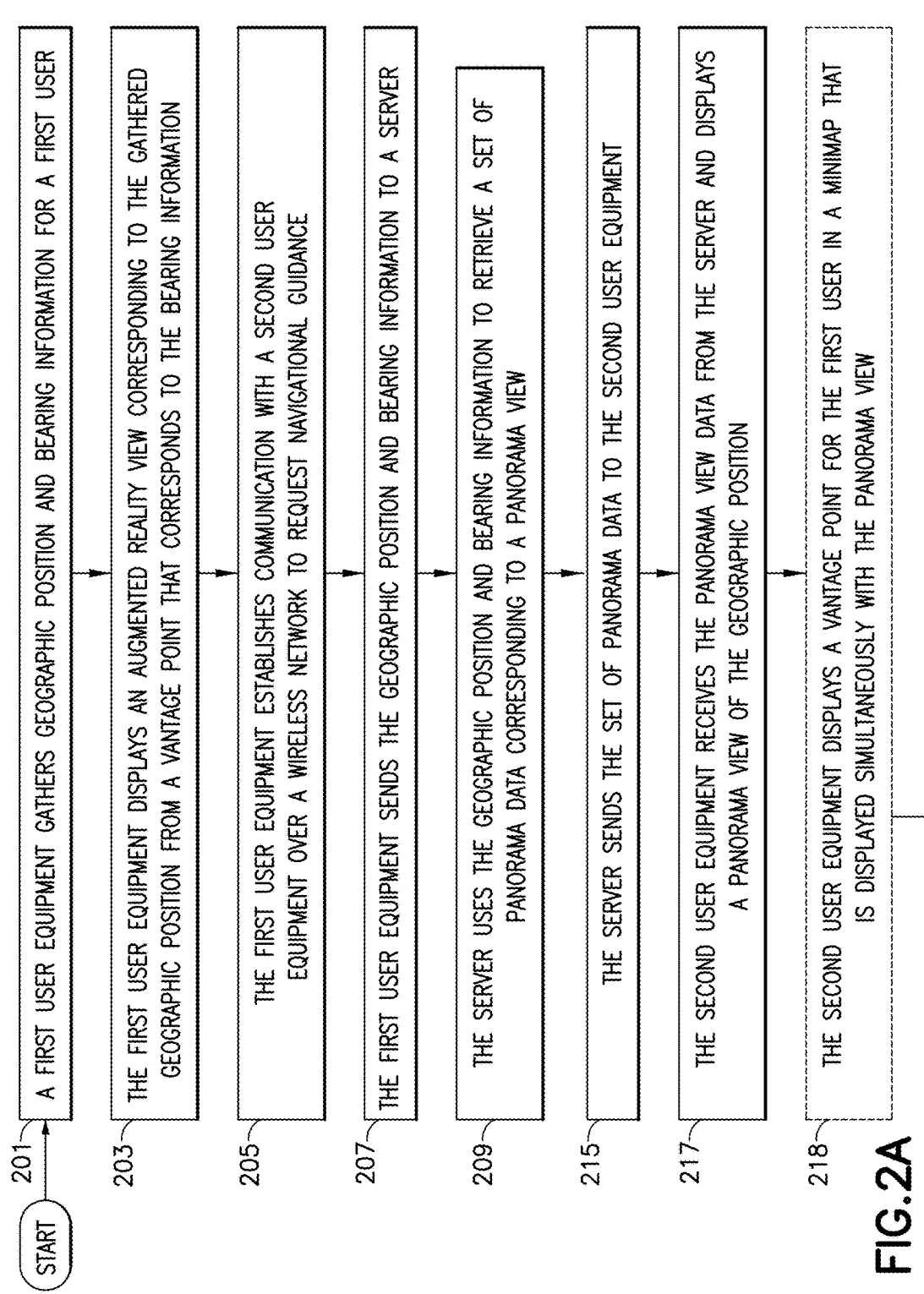

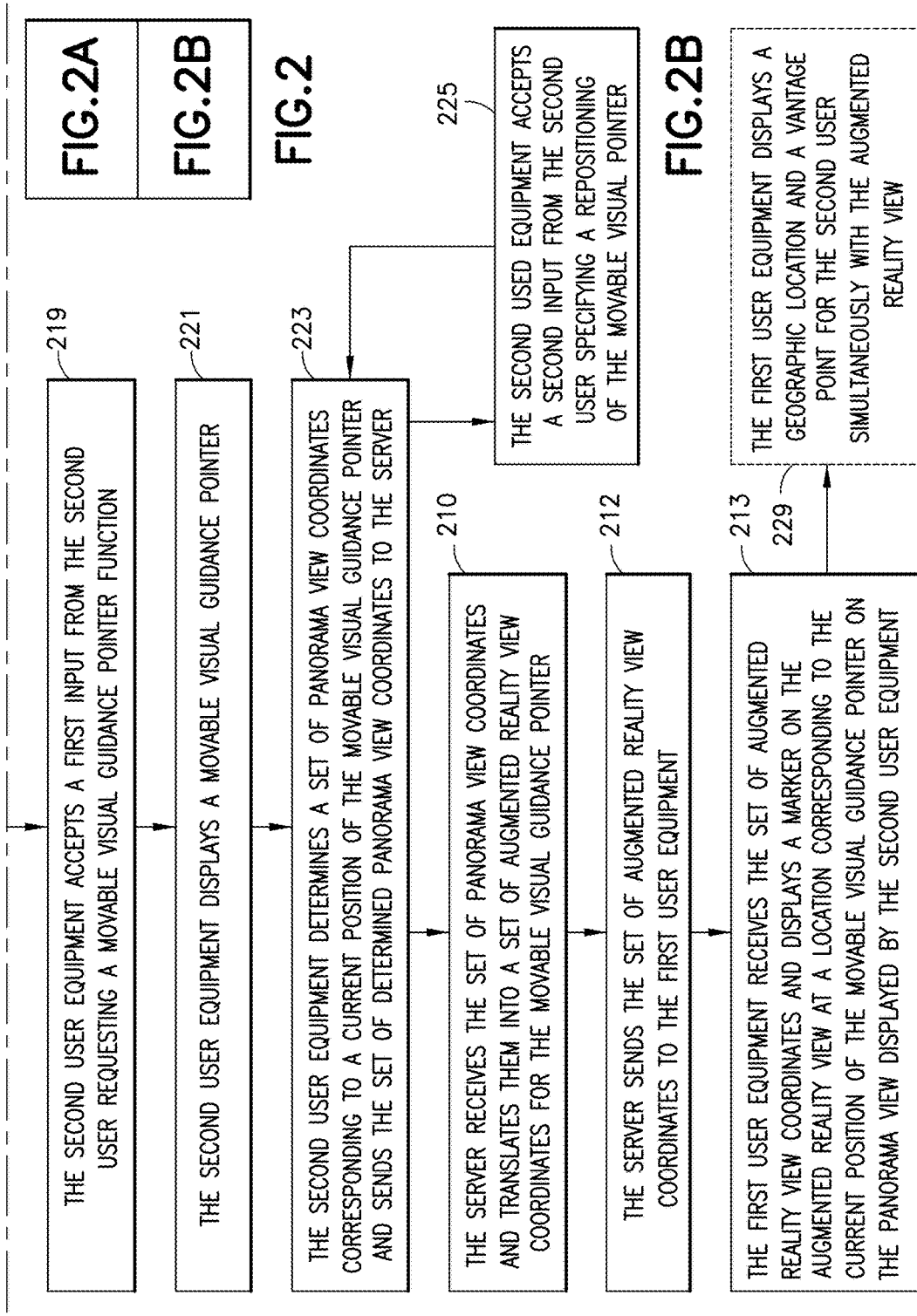

METHODS, APPARATUSES, AND COMPUTER-READABLE STORAGE MEDIA FOR PROVIDING INTERACTIVE NAVIGATIONAL ASSISTANCE USING MOVABLE GUIDANCE MARKERS

TECHNICAL FIELD

This invention relates generally to wireless networks and, more specifically, to methods, apparatuses, and computer-readable storage media for providing interactive navigational assistance using movable guidance markers.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Oftentimes there is a need for a first user to obtain navigational instructions from a second user when the first and second users are at different locations. Various techniques for navigational assistance are based upon the first user placing a video call from a first user equipment to a second user equipment over a wireless communications network. Images captured by a camera at the first user equipment are sent to the second user equipment. By using voice or text messaging at the second user equipment, the second user instructs the first user (i.e. the person requiring navigational guidance) to point the camera towards a vantage point, so as to assist the second user in identifying the location of the first user. However, in many situations, the second user may have difficulty recognizing the location from the vantage point initially provided by the first user. Thus, the second user may have to repeatedly tell the first user to move around and point the camera in different directions, by trial and error, until the second user hopefully observes a familiar image. Hence there is a need for improved methods, apparatuses, and computer-readable storage media that are capable of providing enhanced navigational assistance.

SUMMARY OF THE INVENTION

According to a first aspect of the invention, a method comprises displaying at a first user equipment a first marker at a location wherein the location is defined remotely at a second user equipment; displaying at the second user equipment a current geographic location and a current vantage point for the first user equipment; displaying at the second user equipment a second marker; accepting at the second user equipment an input for adjusting the second marker from a first position to a second position, wherein the second position is indicative of a target geographic location in a first virtual view of the current geographic location of the first user equipment as displayed on the second user equipment; and in response to the adjusting, displaying at the first user equipment the first marker at the target geographic location in a second virtual view of the current geographic location.

According to a second aspect of the invention, an apparatus is configured to accept an input for defining a location. The apparatus comprises a second user equipment for use with a first user equipment that is configured to display a first marker at a current geographic location of the first user equipment. The second user equipment is configured to display a current geographic location and a current vantage point for the first user equipment; the second user equipment displaying a second marker; the second user equipment accepting the input and, in response thereto, adjusting the second marker from a first position to a second position, wherein the second position is indicative of a target geographic location in a first virtual view of the current geographic location of the first user equipment; and in response to the adjusting, causing the first user equipment to display the first marker at the target geographic location in a second virtual view of the current geographic location.

Illustratively, the first and second markers may each be implemented using any of a persistent pointer, a non-persistent pointer, a persistent highlighted region, or a non-persistent highlighted region. For example, if the first and second markers are both implemented using persistent pointers, then a first pointer is first displayed in some location on the first user equipment and then moved to a displayed location on the first user equipment as specified by a remote user manipulating a second pointer at the second user equipment. Alternatively or additionally, the first and second markers may be implemented by a non-persistent pointing or highlighting mechanism on the second user equipment wherein the remote user taps a finger on a selected displayed building or selected portion of the displayed building, and for a short period of time such as a few seconds, a highlighted area or region is displayed at, or surrounding, or next to a geographic location corresponding to the finger tap on both the first and the second user equipments. In this example, a temporarily or momentarily highlighted area is used to provide a first marker on the first user equipment and a second marker on the second user equipment. Alternatively or additionally, the first marker may be implemented using a persistent pointer and the second marker may be implemented using a non-persistent highlighted area. Alternatively or additionally, the first marker may be implemented using a non-persistent highlighted area and the second marker may be implemented using a persistent pointer. Alternatively or additionally, the highlighted area may remain highlighted until a user input is received such as tapping, touching, or pressing a non-highlighted area of the first or second user equipment display. The highlighted area may comprise an entire building, or a portion of a building, or a particular floor of a building.

According to a third aspect of the invention, a non-transitory computer readable storage medium is provided with an executable program stored thereon. The program instructs a processing device to perform displaying at a first user equipment a first marker at a location wherein the location is defined remotely at a second user equipment; displaying at the second user equipment a current geographic location and a current vantage point for the first user equipment; displaying at the second user equipment a second marker; accepting at the second user equipment an input for adjusting the second marker from a first position to a second position, wherein the second position is indicative of a target geographic location in a first virtual view of the current geographic location of the first user equipment as displayed on the second user equipment; and in response to the adjusting, displaying at the first user equipment the first marker at the target geographic location in a second virtual view of the current geographic location.

BRIEF DESCRIPTION OF THE DRAWINGS

FIGS. 2A and 2B together comprise a flowchart illustrating an exemplary method for providing interactive navigational assistance using guidance markers in accordance with the instant invention;

DETAILED DESCRIPTION OF THE DRAWINGS

Figure 1:
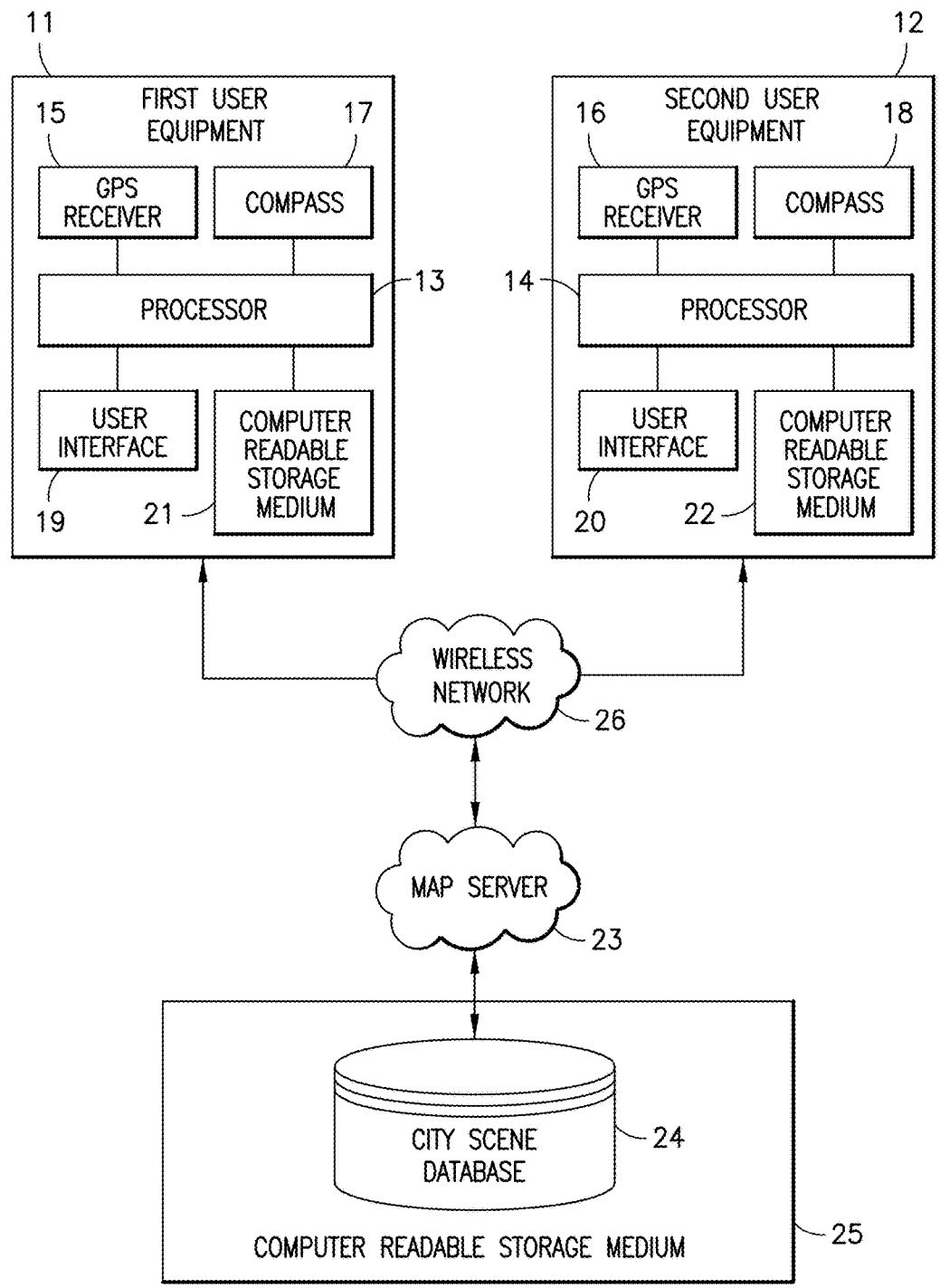
FIG. 1 is a block diagram illustrating an exemplary configuration for providing interactive navigational assistance using guidance markers in accordance with the instant invention.

FIG. 1 is a hardware block diagram illustrating an exemplary configuration for providing interactive navigational assistance using guidance markers in accordance with the instant invention. A first user equipment 11 and a second user equipment 12 are both equipped for communicating over a wireless network 26. Alternatively or additionally, any of the first and second user equipments 11 and 12 may be equipped for communicating over a wired network. Illustratively, the first and second user equipments 11 and 12 may each represent mobile phones, tablets, or wireless handheld devices. The first user equipment 11 includes a processor 13 operatively coupled to a GPS receiver 15, a compass 17, a user interface 19, and a computer readable storage medium 19.

According to one illustrative embodiment of the invention, the second user equipment 12 for use by a second user may include a processor 14 operatively coupled to a GPS receiver 16, a compass 18, a user interface 20, and a computer readable storage medium 22. However, according to other illustrative embodiments, the second user equipment 12 is not required to include a GPS receiver or a compass. A GPS receiver or compass is not required because the second user equipment 12 is configured to display a virtual view corresponding to the current location of the first user equipment 11. The user interface 20 is configured to change the orientation of the virtual view displayed by the second user equipment 12 in response to receiving an input from the second user. The received input illustratively comprises at least one of panning, pressing, or tapping any of various user interface 20 elements on the second user equipment 12 display. Hence, pursuant to these other illustrative embodiments, the second user equipment 12 could be implemented using a regular or stationary personal computer (PC), in lieu of or in addition to the tablets and mobile phones mentioned previously. Yet another option is to use the compass 18 for changing the orientation of a virtual view displayed on the second user equipment 12, but in other cases, implementations for changing the orientation of the virtual view would use a finger input on a touch screen or a mouse input for panning.

The GPS receiver 15 is configured to obtain a set of geographic coordinates based upon the current geographic location of the first user equipment 11. If the second user equipment 12 is so equipped, the GPS receiver 16 is configured to obtain a set of geographic coordinates based upon the current geographic location of the second user equipment 17. The compass 17 is equipped to determine a current bearing or vantage point for the first user equipment 11. If the second user equipment is so equipped, the compass 18 is configured to determine a current bearing or vantage point for the second user equipment 12. For purposes of illustration, the user interfaces 19 and 20 may each be implemented using a touch-sensitive display screen, or alternatively using a display screen and an associated input device such as a mouse, pointer, keypad or stylus.

The wireless network 26 is coupled to a map server 23. The map server 23 is equipped to retrieve a set of view data for a geographic location in response to receiving a set of geographic coordinates and a current bearing. The map server sends the retrieved set of view data to the wireless network 26. The wireless network 26 distributes the set of view data to at least one of the first user equipment 11 or the second user equipment 12. The view data is processed by the first user equipment 11 or the second user equipment 12 to display at least one of a map view, an Augmented Reality (AR) view, a panorama view, or a virtual view that includes a three-dimensional (3D) model. The 3D model may, but need not, include panorama views. Alternatively or additionally, the 3D model may utilize 3D models of buildings that are textured using photos from the real world.

The panorama view is capable of providing a full 360-degree freedom of movement to point in any direction or bearing regardless of a current direction or bearing along which the AR view is oriented. The map server 23 stores panorama content data, including three-dimensional objects of buildings), to one or more user equipments such as the first and second user equipments 11 and 12. Using three-dimensional objects allows accurate pointing even though a first viewpoint of a given geographic location as displayed on the first user equipment 11 and a second viewpoint of the given geographic location as displayed on the second user equipment 12 may be taken from different vantage points.

The map server also relays guidance pointer information from the second user equipment 12 to the first user equipment 11. Optionally, the map server 23 may store a contacts list for each of a plurality of users, as well as repeatedly exchanging geographic location and vantage point data between two or more users. The map server 23 may be programmed to translate a second user's guidance pointer coordinates obtained through the panorama view into a first user's AR view.

The optional map view displays a current location for the first user equipment 11 or the second user equipment 12 by placing a cursor or marker on a two-dimensional street map or road map of a geographic area corresponding to the set of geographic coordinates and the current bearing. The AR view displays a visual image for the set of geographic coordinates and the current bearing in the form of a perspective view. The AR view displays the current location for the first user equipment 11 or the second user equipment 12 by overlaying a cursor or marker onto the displayed perspective view. This perspective view is similar or identical to what would be viewed, for example, through a viewfinder of a digital camera.

The panorama view is created from photographs of buildings and structures in a geographic area. Illustratively, the photographs may be captured using a vehicle-mounted camera, with geographic coordinate data and laser rangefinder data being collected and associated with each photograph that is taken. An image file for each of a plurality of photographs, along with the laser rangefinder data and geographic coordinate data associated with each image file, are stored in a map and panorama database 24 on a computer-readable storage medium 25 that is accessible by the map server 23. The image files, laser rangefinder data, and geographic coordinate data are used to generate a three-dimensional (3D) model of the geographic area. Alternatively or additionally, the 3D model may be acquired separately and the laser rangefinder data used to align the 3D model with the photographs. A respective set of photographs, laser rangefinder data, and geographic coordinate data, which together comprise a set of panorama data from the 3D model, are used to generate a panorama view for a corresponding geographic position and bearing.

FIGS. 2A and 2B together comprise a flowchart illustrating an exemplary method for providing interactive navigational assistance using guidance markers in accordance with the instant invention. Oftentimes there is a need for a first user at the first user equipment 11 (FIG. 1) to obtain navigational instructions from a second user at a second user equipment 12 when the first and second users are at different locations. In overview, the operational sequence of FIG. 2 provides a technical solution wherein the first user equipment 11 (FIG. 1) displays an augmented reality (AR) view corresponding to a current geographic location and a current vantage point of the first user equipment. The second user equipment 12 displays a panorama view corresponding to the current geographic location and the current vantage point of the first user equipment. The second user equipment 12 accepts a first input for changing the vantage point of the panorama view that is displayed on the second user equipment 12. The second user equipment 12 accepts a second input for adjusting a location of a first visual guidance pointer on the panorama view that is displayed on the second user equipment 12. The first visual guidance pointer is a marker that illustratively comprises any of a persistent pointer, a non-persistent pointer, a persistent highlighted area or region, or a non-persistent highlighted area or region. Alternatively or additionally, the highlighted area may remain highlighted until a user input is received such as tapping, touching, or pressing a non-highlighted area of the first or second user equipment 11, 12 display. The displayed AR view of the first user equipment 11 includes a second visual guidance pointer which is moved in response to the adjusting of the location of the first visual guidance pointer on the panorama view of the first user equipment 11. The second visual guidance pointer is a marker that illustratively comprises any of a persistent pointer, a non-persistent pointer, a persistent highlighted area or region, or a non-persistent highlighted area or region. A voice or textual communication channel may be active between the first user equipment 11 and the second user equipment 12 over the wireless network 26 during all or a portion of the operational sequence shown in FIGS. 2A and 2B. Any of the first or second visual guidance pointers may illustratively comprise a highlighted area that includes an entire building, or a portion of a building, or a particular floor of a building. Thus, identifying a current geographic location may include identifying not only a latitude and a longitude, or similar coordinates, but also a parameter that is indicative of height above ground.

The operational sequence of FIGS. 2A and 2B commences at block 201 of FIG. 2A where a first user equipment 11 (FIG. 1) gathers geographic position and bearing information for a first user. The first user equipment 11 displays an Augmented Reality (AR) view corresponding to the gathered geographic position and from an AR view vantage point that corresponds to the bearing information (FIG. 2A, block 203). Next, the first user equipment 11 (FIG. 1) establishes communication with a second user equipment 12 over a wireless network 26 to request navigational guidance (FIG. 2A, block 205).

At block 207, the first user equipment 11 (FIG. 1) sends the geographic position and bearing information to a map server 23 over the wireless network 26. The bearing information may, but need not, comprise AR view vantage point information. The map server 23 uses the geographic position and the bearing information to retrieve a set of panorama data for generating a panorama view corresponding to the geographic position and bearing information (FIG. 2A, block 209). Next, at block 211, the map server 23 (FIG. 1) sends the set of panorama data to the second user equipment 12. The second user equipment 12 receives the panorama data from the map server 23 over the wireless network 26 and displays a panorama view closely corresponding to the geographic position and having a panorama view vantage point that closely corresponds to the AR vantage point of the first user equipment 11 (FIG. 2A, block 213). In practice, the panorama view corresponds as closely as possible to the geographic position, but in some cases, the closest available panorama data may be somewhat off for certain geographic positions.

Optionally, one or both of the first and second user equipments 11 and 12 (FIG. 1) display a map view vantage point for the first user in a mini-map that is displayed simultaneously with the AR view or the panorama view, respectively, (FIG. 2A, block 215), where the map view vantage point is obtained from the bearing information that was previously gathered in block 201. For the second equipment 12 (FIG. 1), note that this bearing information might not be obtained with reference to the physical or geographic location of the second user equipment 12, but instead the bearing information may pertain to a virtual viewpoint of a geographic location at which the first user equipment 11 is situated and for which the second user equipment 12 is displaying a virtual view. For example, the bearing information of the second user equipment 12 may be determined with reference to a location on a panorama view displayed on the screen of the second user equipment 12.

At block 217 (FIG. 2A), the second user equipment 12 (FIG. 1) accepts a first input for changing the panorama view vantage point of the panorama view to a new panorama view vantage point. Effectively, this enables the second user to view panorama views of the same geographical location from a plurality of different perspectives. At block 219 (FIG. 2A), the second user equipment 12 (FIG. 1) sends a request for new panorama view data corresponding to the new panorama view vantage point to the map server 23. The second user equipment 12 receives new panorama view data from the map server corresponding to the new panorama view vantage point and displays a new panorama view corresponding to the new panorama view vantage point (FIG. 2A, block 221). The second user equipment 12 (FIG. 1) accepts a second input requesting a movable visual guidance pointer function and, in response thereto, displays a first visual guidance pointer on the panorama view that is currently being displayed on the second user equipment (FIG. 2A, block 223).

The operational sequence of FIGS. 2A and 2B advances to block 225 of FIG. 2B where the second user equipment 12 (FIG. 1) determines a set of geographic coordinates corresponding to the current position of the first visual guidance pointer by using a three-dimensional (3D) model of the displayed panorama view. The 3D model may be obtained from the map server 23 over the wireless network 26, or stored in the second user equipment 12, or both. The second user equipment 12 then sends the set of geographic coordinates to the first user equipment 11 over the wireless network 26. The second user equipment 12 accepts a third input from the second user specifying a repositioning of the first visual guidance pointer (FIG. 2B, block 227). The program then loops back to block 225 (FIG. 2B) where the second user equipment 12 (FIG. 1) determines a new set of geographic coordinates corresponding to the new position of the first visual guidance pointer. The second user equipment 12 determines a new set of geographic coordinates corresponding to the new position of the first visual guidance pointer by using the 3D model of the displayed panorama view. The second user equipment 12 then sends the new set of geographic coordinates to the first user equipment 11 over the wireless network 26.

Program control progresses from block 225 (FIG. 2B) to block 229 where the first user equipment 11 (FIG. 1) receives the set of geographic coordinates from the second user equipment 12 over the wireless network 26. Next, at block 233 (FIG. 2B), the first user equipment 11 (FIG. 1) displays a second visual guidance pointer on the AR view at a location corresponding to the geographic coordinates received from the second user equipment at block 229 (FIG. 2B). The second visual guidance pointer may be implemented in the form of a cursor or marker. Optionally, the first user equipment 11 (FIG. 1) displays a geographic location and a vantage point for the second user equipment 12, or a virtual viewpoint for the second user equipment 12, simultaneously with the AR view (FIG. 2B, bock 235). Optionally, additional descriptions of buildings may be exchanged (or pre-stored) by the first and second user equipments 11 and 12 (FIG. 1) to ensure that the first user equipment 11 places the second visual guidance pointer in the AR view on top of the correct building, and even at the correct floor of a building. If the vantage point of the first user equipment 11 differs from the virtual viewpoint of the second user equipment 12, such that a camera of the first user equipment 11 is aimed along a different bearing than the bearing of the virtual viewpoint or viewing direction currently being displayed by the second user equipment, then the map server 23 or the first user equipment 11 may be programmed to provide a visual hint for orienting the first user equipment to a new or different vantage point.

As an alternate or addition to blocks 225 and 229, the second user equipment 12 (FIG. 1) may determine a set of panorama view coordinates corresponding to a current position of the movable visual guidance pointer. The second user equipment 12 then sends the set of panorama view coordinates to the map server 23. The map server 23 translates the set of panorama view coordinates into a set of AR view coordinates for a fixed visual guidance pointer to be displayed by the first user equipment 11. The map server 23 then sends the set of AR view coordinates to the first user equipment 11 (FIG. 2B, block 231). The first user equipment 11 (FIG. 1) receives the set of AR view coordinates and displays a fixed marker or cursor on the AR view at a location corresponding to the current position of the movable visual guidance pointer on the panorama view displayed by the second user equipment 12.

Pursuant to the procedure described in FIGS. 2A and 2B, a user at the second user equipment 12 (FIG. 1) may be regarded as the "remote guidance provider". This user can freely choose freely his/her vantage point with reference to the panorama view. This user can, for example, point at a building from a different vantage point than the vantage point of the first user equipment 11.

Figure 3:
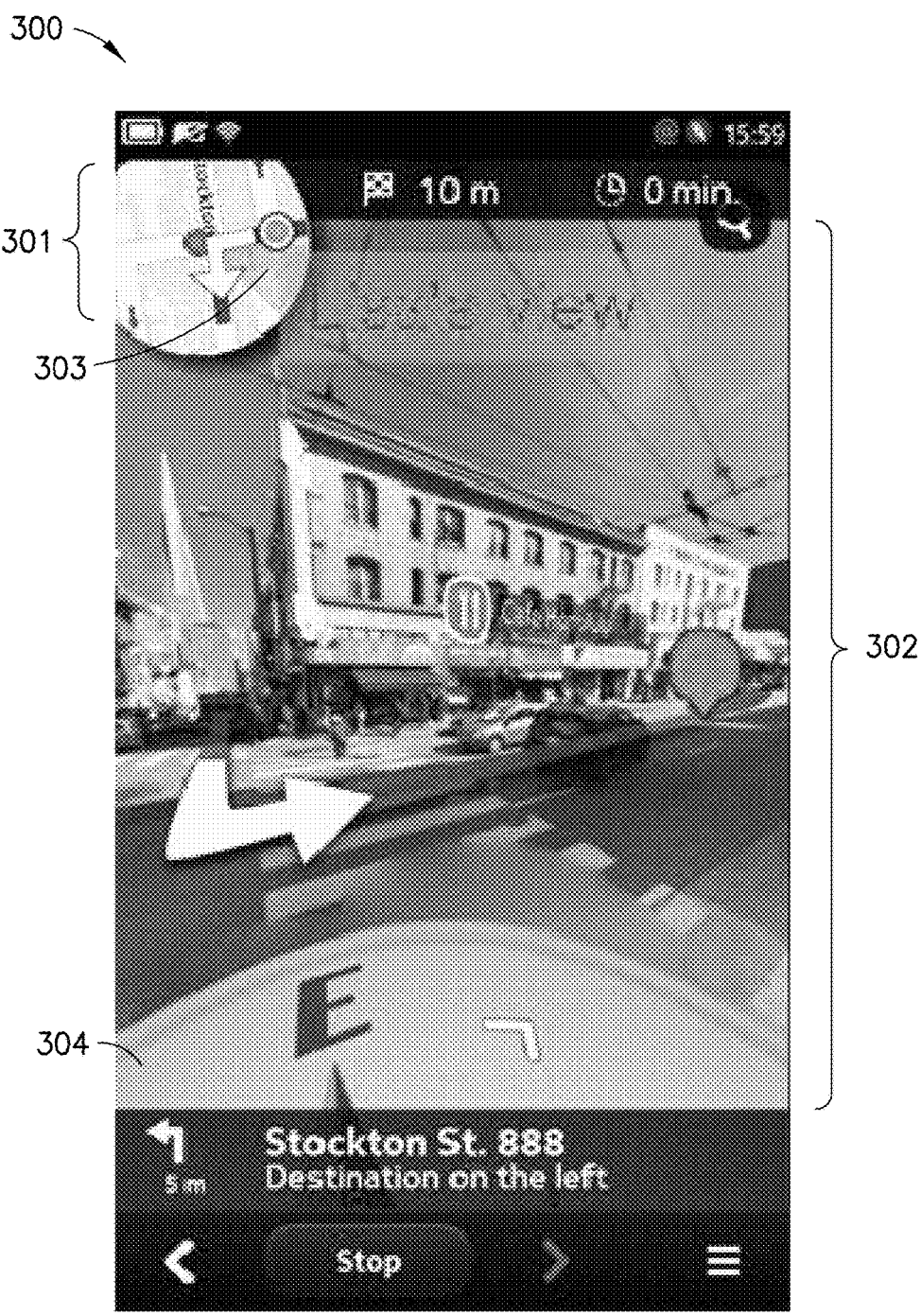
FIG. 3 illustrates an exemplary screen capture of a first graphical user interface for providing interactive navigational assistance in accordance with the instant invention.

FIG. 3 illustrates an exemplary screen capture of a graphical user interface 300 for receiving interactive navigational assistance at the first user equipment 11 (FIG. 1) in accordance with the instant invention. A miniature map 301 (FIG. 3) at the upper left corner of the interface 300 displays the current location of the user equipment 11 (FIG. 1), and a shaded wedge 303 (FIG. 3) displays the current bearing or vantage point for the user equipment 11 (FIG. 1). The current bearing or vantage point is also displayed by a large compass 304 (FIG. 3) at the base of the interface 300. The user equipment (FIG. 1) 11 displays an Augmented Reality (AR) view 302 (FIG. 3) of the current location. In this example, the user equipment 11 (FIG. 1) is being used by a user named Lisa. Lisa arrives at her approximate destination which is the Café Honolulu, but she is unsure about the exact location of the Café. The placement of a point of interest icon 312 (FIG. 3) on the AR view 302 by the map server 23 (FIG. 1) is not accurate. Moreover, the building complex shown on the AR view 302 (FIG. 3) has many different entrances. To cause further uncertainty for Lisa, the point of interest icon 312 is in English but the actual Café has its signs in a foreign language that Lisa does not understand.

Figure 4:
FIG. 4 illustrates an exemplary screen capture of a second graphical user interface for providing interactive navigational assistance using guidance markers in accordance with the instant invention.

FIG. 4 illustrates an exemplary screen capture of a graphical user interface for receiving interactive navigational assistance at the first user equipment 11 (FIG. 1) in accordance with the instant invention. The graphical user interface of FIG. 4 shows the AR view 302 of FIG. 3 in a landscape mode. The landscape mode may provide for a display of live video from the current location of the first user equipment 11 (FIG. 1).

Figure 5:
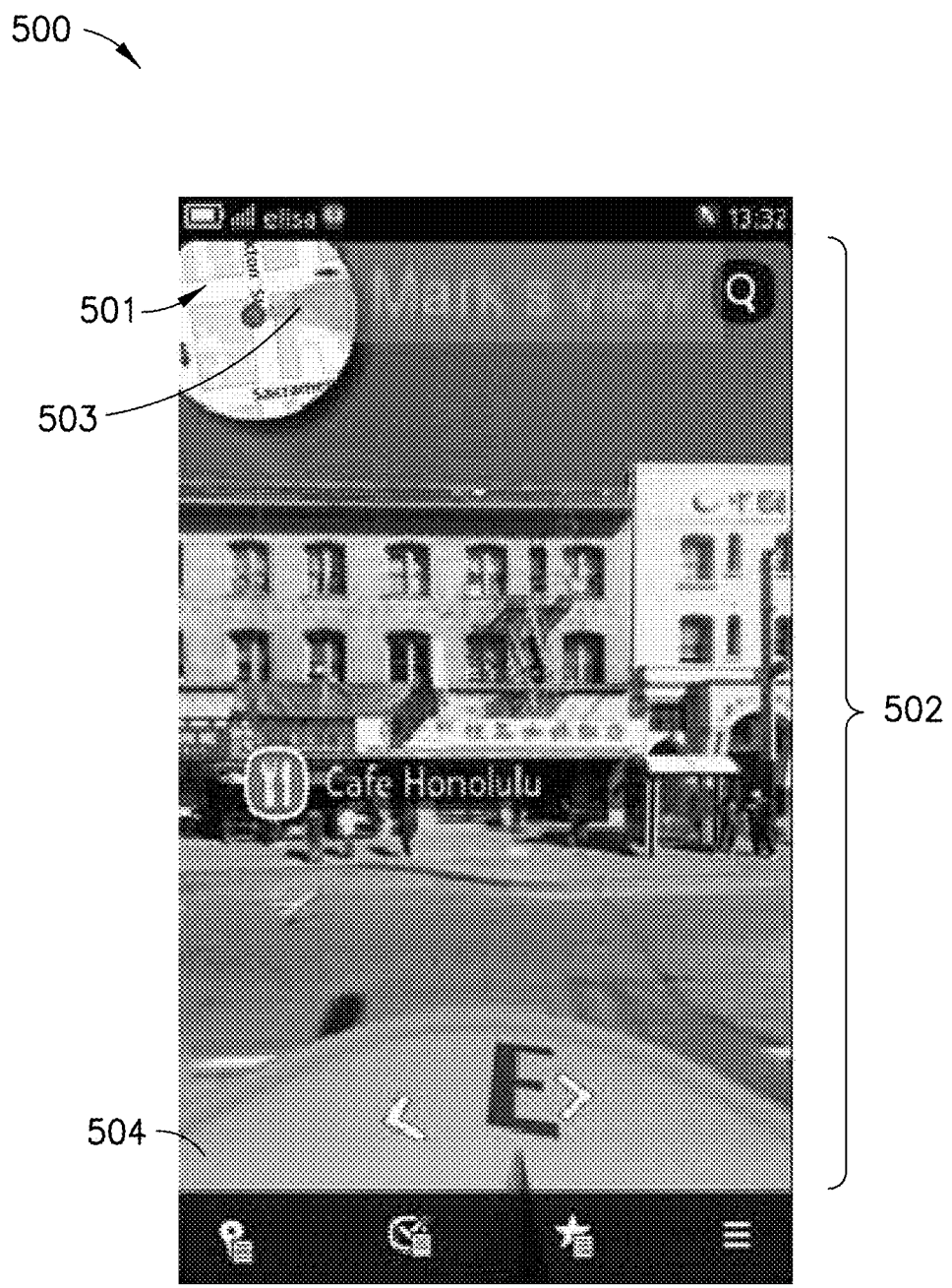
FIG. 5 illustrates an exemplary screen capture of a third graphical user interface for providing interactive navigational assistance using guidance markers in accordance with the instant invention.

FIG. 5 illustrates an exemplary screen capture of a graphical user interface 500 for providing interactive navigational assistance from the second user equipment 12 (FIG. 1) to the first user equipment 11 in accordance with the instant invention. Lisa is confused about the exact location of the Café, so she calls her friend Mark for some navigational guidance. Mark is at the second user equipment 12 (FIG. 1). Once Mark answers Lisa's call at the second user equipment 12, the second user equipment is configured to display a panorama view 502 (FIG. 5) of the location of the first user equipment 11. The graphical user interface 500 also includes a miniature map 501 (FIG. 5) at the upper left corner of the live video view 500 that displays the current location of the first user equipment 11 (FIG. 1), and a shaded wedge 503

(FIG. 5) that displays the current hearing or vantage point for the first user equipment 11 (FIG. 1). The current bearing or vantage point of the first user equipment 11 is also displayed by a large compass 504 (FIG. 5) at the base of the live video view 500.

Figure 6:
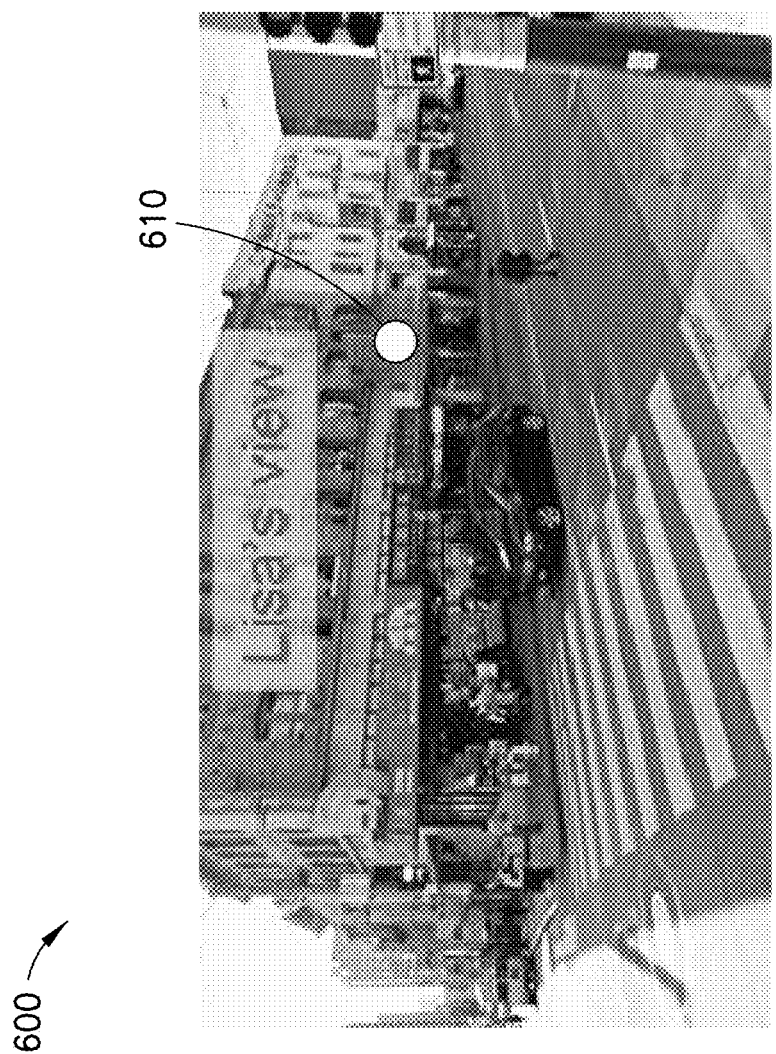
FIG. 6 illustrates an exemplary screen capture of a fourth graphical user interface for providing interactive navigational assistance using guidance markers in accordance with the instant invention.

FIG. 6 illustrates an exemplary screen capture of a graphical user interface for receiving interactive navigational assistance at the first user equipment 11 (FIG. 1) in accordance with the instant invention. In this example, a visual guidance pointer 610 (FIG. 6) appears on an AR view 600 of the graphical user interface 400 shown in FIG. 4 This visual guidance pointer 610 (FIG. 6) indicates that the second user equipment 12 (FIG. 1) has received a panorama view of the location of the first user equipment 11. The second user equipment 12 is now ready to accept an input from Mark for providing navigational guidance to the first user equipment.

Figure 7:
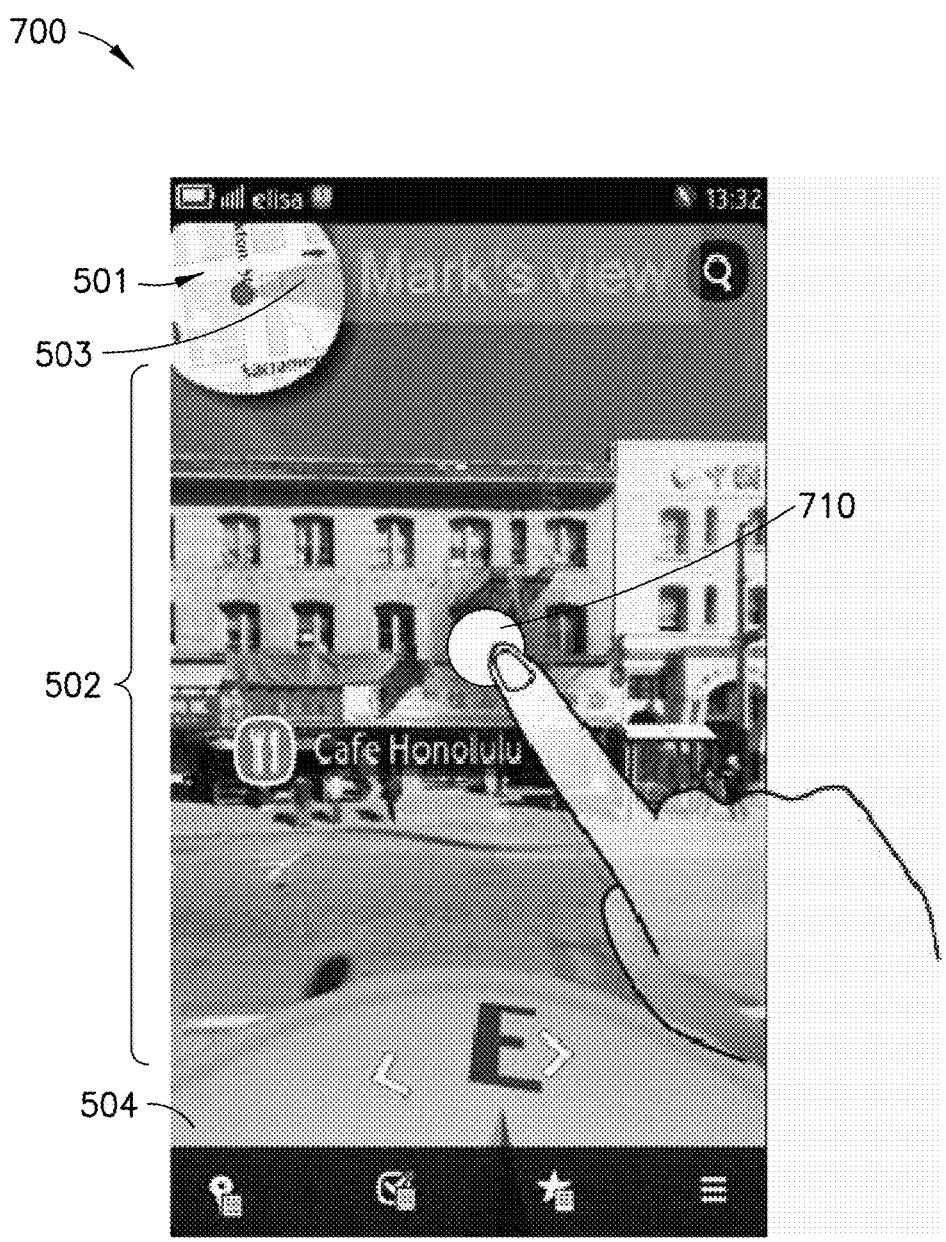
FIG. 7 illustrates an exemplary screen capture of a fifth graphical user interface for providing interactive navigational assistance using guidance markers in accordance with the instant invention.
Figure 8:
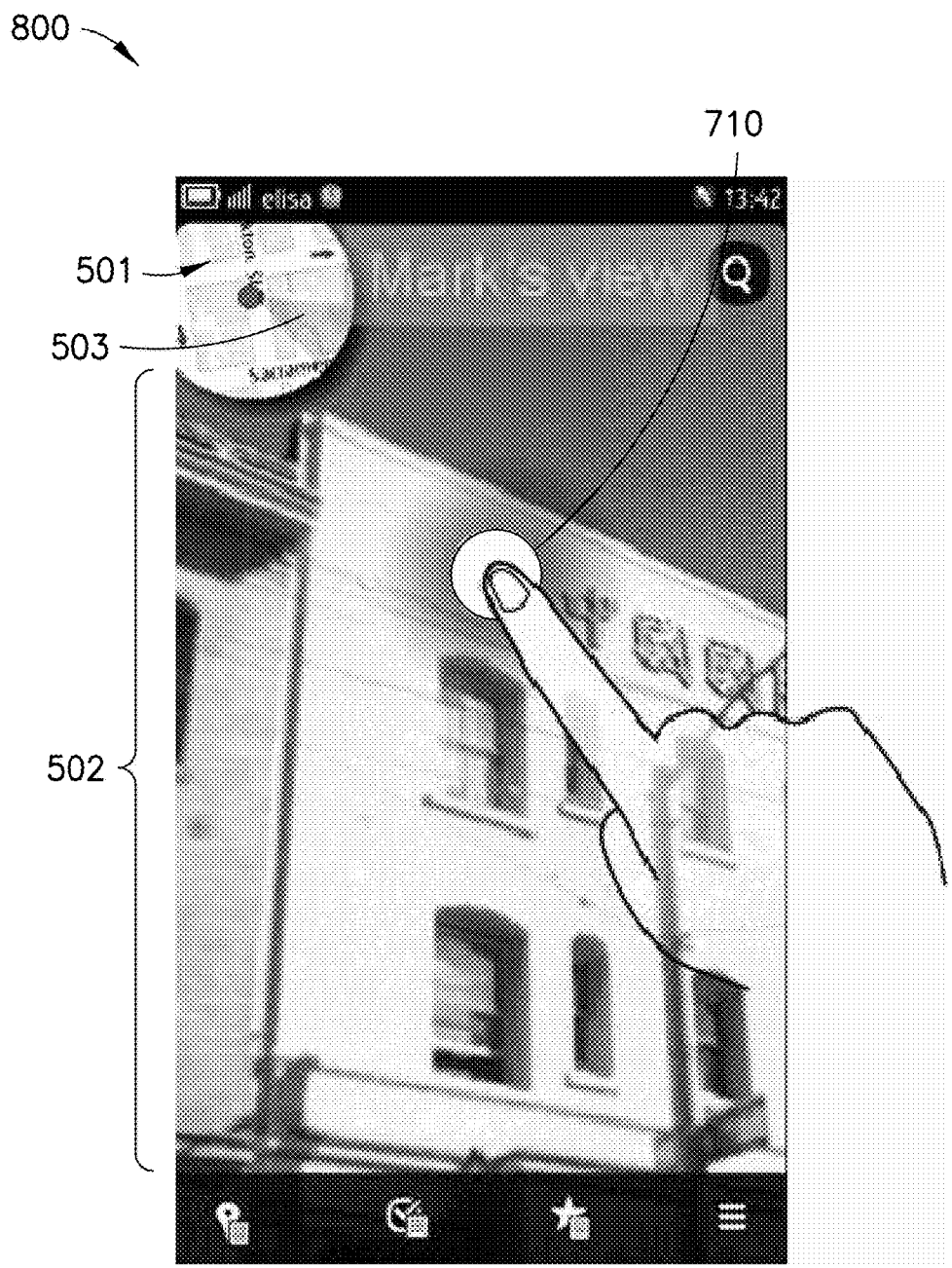
FIG. 8 illustrates an exemplary screen capture of a sixth graphical user interface for providing interactive navigational assistance using guidance markers in accordance with the instant invention.

FIGS. 7 and 8 illustrate exemplary screen captures 700 and 800, respectively, of a graphical user interface for providing interactive navigational assistance at the second user equipment 12 (FIG. 1) using a marker in the form of a movable visual guidance pointer 710 (FIG. 7) in accordance with the instant invention. As before, the second user equipment is configured to display a panorama view 502 (FIGS. 5, 7, and 8) of the location of the first user equipment 11 (FIG. 1). Mark moves the movable visual guidance pointer 710 from an initial position shown in FIG. 7 to a new position shown in FIG. 8. In this example, Mark knows where the Café that Lisa is looking for is located. Therefore, Mark has moved the movable visual guidance pointer 710 (FIGS. 7 and 8) from the second floor of the building in the center of the screen captures 700 and 800 to the attic level of the building at the right hand side of the screen captures. The screen capture 800 of FIG. 8 also illustrates that, optionally, the second user equipment 12 (FIG. 1) may be provided with the capability of zooming in on a desired location within the panorama view 502.

Figure 9:
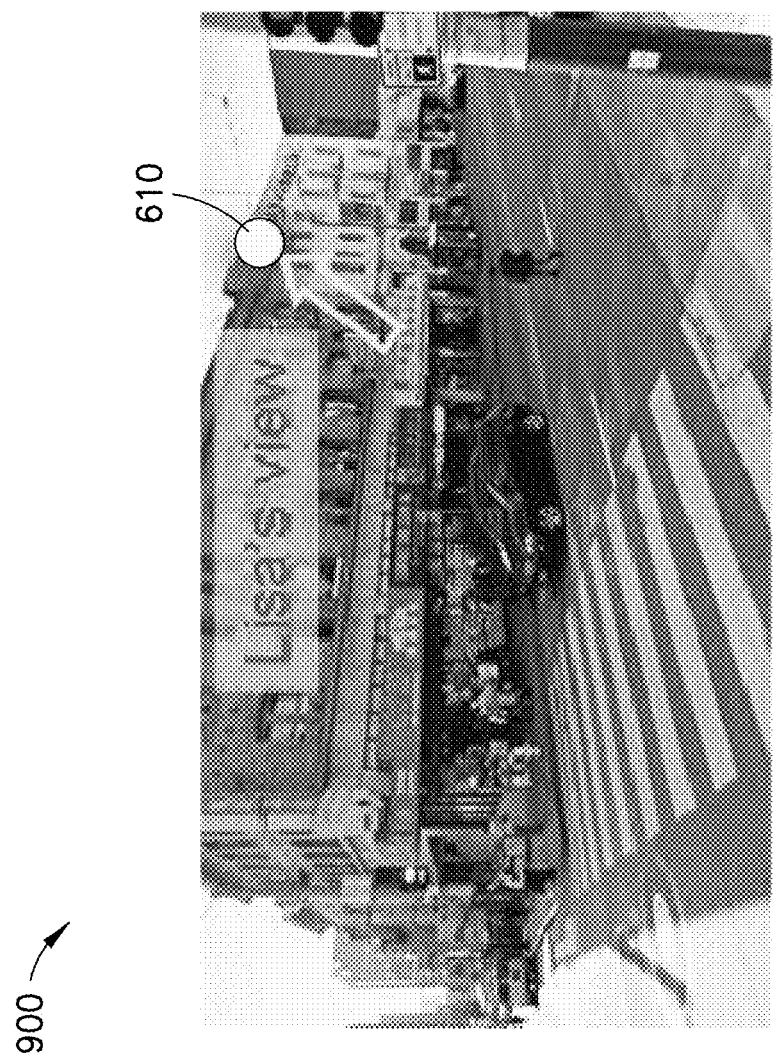
FIG. 9 illustrates an exemplary screen capture of a seventh graphical user interface for providing interactive navigational assistance using guidance markers in accordance with the instant invention.

FIG. 9 illustrates an exemplary screen capture of a graphical user interface 900 for receiving interactive navigational assistance at the first user equipment 11 (FIG. 1) using a marker in the form of a visual guidance pointer 610 (FIG. 9) in accordance with the instant invention. As the movable visual guidance pointer 710 (FIGS. 7 and 8) is moved on the second user equipment 12 (FIG. 1), the visual guidance pointer 610 (FIG. 9) moves correspondingly on the first user equipment 11 (FIG. 1) from a first location as shown in FIG. 6 to a second location as shown in FIG. 9. In addition to, or in lieu of, the dot-shaped guidance pointers 610 and 710 (FIGS. 6-9), many other kinds of visual indications may be employed including making a pointed building glow with a different color, shade, brightness, or intensity relative to surrounding buildings. The guidance pointers 610 and 710 may be implemented using any method for highlighting a portion of a building in an AR view. Optionally, the second user equipment 12 may be equipped to accept a multi-touch or hover sensing input to define multiple points for the guidance pointers 610, 710. For example, with a two-finger input, the movable visual guidance pointer 710 (FIG. 7) may be manipulated to highlight an entire floor of a building. Alternatively or additionally, the highlighted area may remain highlighted until a user input is received such as tapping, touching, or pressing a non-highlighted area of the first or second user equipment 11, 12 (FIG. 1) display.

Figure 10:
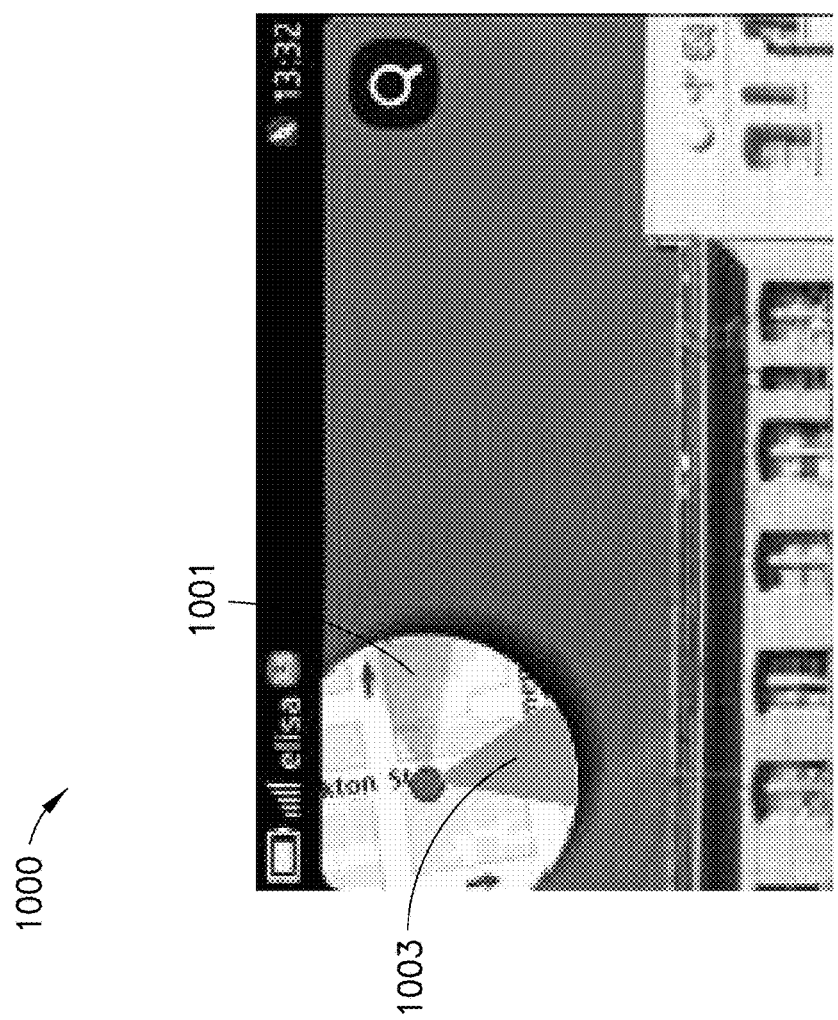
FIG. 10 illustrates an exemplary screen capture of an eighth graphical user interface for providing interactive navigational assistance using guidance markers in accordance with the instant invention.

FIG. 10 illustrates an exemplary screen capture of a graphical user interface 1000 for providing interactive navigational assistance at the second user equipment 12 (FIG. 1). In this example, a second user at the second user equipment 12 may change his or her vantage point (i.e., bearing) to a different vantage point than that provided by the first user equipment 11. For example, a second user may wish to take a look around the location of the first user equipment 11 without instructing a first user at the first user equipment 11 to pan their camera around. The graphical user interface 1000 (FIG. 10) indicates on a miniature map a first wedge 1001 illustrating a bearing or vantage point for the first user equipment 11 (FIG. 1) and a second wedge 1003 (FIG. 10) illustrating a bearing or vantage point for the second user equipment 12 (FIG. 1).

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium 21 or 22, or other device that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Although various aspects of the invention are set out above, other aspects of the invention comprise other combinations of features from the described embodiments, and not solely the combinations explicitly get out above.

It is also noted herein that while the above describes example embodiments of the invention, these descriptions should not be viewed in a limiting sense. Rather, there are several variations and modifications which may be made without departing from the scope of the present invention.

The invention claimed is:

1. A method comprising:
determining a current geographic location and bearing information for a first user equipment;
displaying a second virtual view in the first user equipment;
displaying a first virtual view in a second user equipment generated based on the current geographic location and the bearing information for the first user equipment;
displaying at the second user equipment a second guidance marker used for navigational assistance;
displaying at the first user equipment a first guidance marker used for navigational assistance at a first location wherein the first location is defined remotely at the second user equipment in the first virtual view and the location of the first guidance marker is determined by translating the second guidance marker coordinates into the first virtual view;
displaying at the second user equipment a current geographic location for the first user equipment;
accepting at the second user equipment an input, wherein the user input selects an adjustment made to the second guidance marker from a first position to a second position, wherein the second position is selected by the user input to be indicative of a target geographic location in a first virtual view of the current geographic location of the first user equipment as displayed on the second user equipment; and in response to the adjusting, displaying at the first user equipment the first guidance marker at the target geographic location in a second virtual view of the current geographic location, wherein the first guidance marker displayed at the target geographic location in the second virtual view provides navigation guidance to the first user for navigating to the target geographic location based on the user input selecting the adjustment made to the second guidance marker from the first position to the second position.

2. The method of claim 1 wherein the first guidance marker comprises at least one of a persistent pointer, a non-persistent pointer, a persistent highlighted area, or a non-persistent highlighted area, and wherein the second guidance marker comprises at least one of a persistent pointer, a non-persistent pointer, a persistent highlighted area, or a non-persistent highlighted area.

3. The method of claim 1 further comprising providing the first virtual view by displaying at the second user equipment a panorama view corresponding to the current geographic location and the current vantage point of the first user equipment.

4. The method of claim 1 further comprising providing the second virtual view by displaying at the first user equipment an augmented reality view corresponding to the current geographic location and the current vantage point of the first user equipment.

5. The method of claim 3 further comprising accepting at the second user equipment a first input for changing the vantage point of the panorama view that is displayed on the second user equipment.

6. The method of claim 5 further comprising accepting at the second user equipment a second input for adjusting a location of the second guidance marker on the panorama view that is displayed on the second user equipment, wherein the displayed augmented reality view of the first user equipment includes the first marker, and the first guidance marker moves in response to the adjusting of the location of the second guidance marker on the panorama view of the second user equipment.

7. The method of claim 1 further comprising providing a voice or textual communication channel between the first user equipment and the second user equipment.

8. The method of claim 7 wherein the communication channel is provided over a wireless communications network.

9. The method of claim 1 wherein the first guidance marker is implemented using a persistent first pointer that is first displayed in any location on the first user equipment and then moved to a displayed location on the first user equipment as specified by a remote user manipulating the second guidance marker at the second user equipment.

10. The method of claim 1 wherein the second guidance marker is implemented by a non-persistent pointing mechanism, such that the second user equipment is configured to accept a finger tap input on a selected displayed building or selected portion of the displayed building, and a highlight is momentarily or temporarily displayed on both the first and the second user equipments at a geographic location corresponding to the finger tap input on the second user equipment, wherein the temporarily or momentarily highlighted area is used to provide the first guidance marker on the first user equipment and the second marker on the second user equipment; or alternatively or additionally, the highlighted area remains highlighted until a user input is received comprising at least one of tapping, touching, or pressing a non-highlighted area on the first or second user equipment.

wherein the first user equipment determines a current geographic location and bearing information, and display a second virtual view.

11. An apparatus configured to accept an input for defining a location;

the apparatus comprising a second user equipment for use with a first user equipment that is configured to display a first guidance marker used for navigational assistance at a location, wherein the first user equipment is configured to determine a current geographic location and bearing information, and display a second virtual view;

the second user equipment being configured to display a first virtual view geographic based on the current geographic location and bearing information for the first user equipment;

the second user equipment being configured to display the current geographic location for the first user equipment;

the second user equipment displaying a second guidance marker used for navigational assistance wherein the first user equipment is configured to display the first guidance marker at a first location wherein the first location is defined remotely at the second user equipment in the first virtual view and the location of the first guidance marker is determined by translating the second guidance marker coordinates into the first virtual view;

the second user equipment accepting the user input and, in response thereto, adjusting the second guidance marker from the first position to a second position, wherein the user input selects an adjustment made to the second position is indicative of a target geographic location in the first virtual view of the current geographic location of the first user equipment; and in response to the adjusting, causing the first user equipment to display the first guidance marker at the target geographic location in the second virtual view of the current geographic location, wherein the first guidance marker displayed at the target geographic location in the second virtual view provides navigation guidance to the first user for navigating to the target geographic location based on the user input selecting the adjustment made to the second guidance marker from the first position to the second position.

12. The apparatus of claim 11 wherein the first guidance marker comprises at least one of a persistent pointer or a non-persistent highlighted area, and wherein the second guidance marker comprises at least one of a persistent pointer or a non-persistent highlighted area.

13. The apparatus of claim 11 wherein the first virtual view is provided by displaying at the second user equipment a panorama view corresponding to the current geographic location and the current vantage point of the first user equipment.

14. The apparatus of claim 11 wherein the second virtual view comprises an augmented reality view corresponding to the current geographic location and the current vantage point of the first user equipment.

15. The apparatus of claim 11 wherein the second user equipment is configured to accept a first input for changing the vantage point of the panorama view that is displayed on the second user equipment.

16. The apparatus of claim 11 wherein the second user equipment is configured to accept a second input for adjusting a location of the second guidance marker on the panorama view that is displayed on the second user equipment, wherein the displayed augmented reality view of the first user equipment includes the first guidance marker, and the first guidance marker moves in response to the adjusting of the location of the second guidance marker on the panorama view of the second user equipment.

17. The apparatus of claim 11 wherein the second user equipment is configured to establish a voice or textual communication channel between the first user equipment and the second user equipment.

18. The apparatus of claim 17 wherein the communication channel is provided over a wireless communications network.

19. The apparatus of claim 11 wherein the first guidance marker is implemented using a persistent first pointer that is first displayed in any location on the first user equipment and then moved to a displayed location on the first user equipment as specified by a remote user manipulating the second marker at the second user equipment.

20. The apparatus of claim 11 wherein the second guidance marker is implemented by a non-persistent pointing mechanism on the second user equipment, such that the second user equipment is configured to accept a finger tap input on a selected displayed building or selected portion of the displayed building, and a highlight is momentarily or temporarily displayed on both the first and the second user equipments at a geographic location corresponding to the finger tap input on the second user equipment, wherein the temporarily or momentarily highlighted area is used to provide the first marker on the first user equipment and the second guidance marker on the second user equipment.

21. A non-transitory computer readable storage medium with an executable program stored thereon, wherein the program instructs a processing device to perform:
   determining a current geographic location and bearing information for a first user equipment;
   displaying a second virtual view in the first user equipment;
   displaying a second virtual view in the first user equipment;
   displaying a first virtual view in a second user equipment generated based on the current geographic location and the bearing information for the first user equipment;
   displaying at the second user equipment a second guidance marker used for navigational assistance;
   displaying at the first user equipment a first guidance marker used for navigational assistance at a first location wherein the first location is defined remotely at the second user equipment in the first virtual view and the location of the first guidance marker is determined by translating the second guidance marker coordinates into the first virtual view;
   displaying at the second user equipment a current geographic location for the first user equipment;
   accepting at the second user equipment a user input, wherein the user input selects an adjustment made to the second guidance marker from the first position to a second position, wherein the second position is selected by the user input to be indicative of a target geographic location in the first virtual view of the current geographic location of the first user equipment as displayed on the second user equipment; and
   in response to the adjusting, displaying at the first user equipment the first guidance marker at the target geographic location in the second virtual view of the current geographic location, wherein the first guidance marker displayed at the target geographic location in the second virtual view provides navigation guidance to the first user for navigating to the target geographic location based on the user input selecting the adjustment made to the second guidance marker from the first position to the second position.

22. The non-transitory computer readable storage medium of claim 21 wherein the first guidance marker comprises at least one of a persistent pointer or a non-persistent highlighted area, and wherein the second guidance marker comprises at least one of a persistent pointer or a non-persistent highlighted area.

23. The non-transitory computer readable storage medium of claim 21 wherein the program further comprises instructions for providing the first virtual view by displaying at the second user equipment a panorama view corresponding to the current geographic location and the current vantage point of the first user equipment.

24. The non-transitory computer readable storage medium of claim 21 wherein the program further comprises instructions for providing the second virtual view by displaying at the first user equipment an augmented reality view corresponding to the current geographic location and the current vantage point of the first user equipment.

25. The non-transitory computer readable storage medium of claim 23 wherein the program further comprises instructions for accepting at the second user equipment a first input for changing the vantage point of the panorama view that is displayed on the second user equipment.

26. The non-transitory computer readable storage medium of claim 21 wherein the program further comprises instructions for accepting at the second user equipment a second input for adjusting a location of the second marker on the panorama view that is displayed on the second user equipment, wherein the displayed augmented reality view of the first user equipment includes the first guidance marker, and the first marker moves in response to the adjusting of the location of the second guidance marker on the panorama view of the second user equipment.

27. The non-transitory computer readable storage medium of claim 21 wherein the program further comprises instructions for providing a voice or textual communication channel between the first user equipment and the second user equipment.

28. The non-transitory computer readable storage medium of claim 21 wherein the program further comprises instructions for providing the communication channel over a wireless communications network.

29. The non-transitory computer readable storage medium of claim 21 wherein the first marker is implemented using a persistent first pointer that is first displayed in any location on the first user equipment and then moved to a displayed location on the first user equipment as specified by a remote user manipulating the second marker at the second user equipment.

30. The non-transitory computer readable storage medium of claim 21 wherein the guidance marker is implemented by a non-persistent pointing mechanism, such that the second user equipment is configured to accept a finger tap input on a selected displayed building or selected portion of the displayed building, and a highlight is momentarily or temporarily displayed on both the first and the second user equipments at a geographic location corresponding to the finger tap input on the second user equipment, wherein the temporarily or momentarily highlighted area is used to provide the first guidance marker on the first user equipment and the second guidance marker on the second user equipment.

\* \* \* \* \*

UNITED STATES PATENT AND TRADEMARK OFFICE
CERTIFICATE OF CORRECTION

PATENT NO.      : 9,525,964 B2
APPLICATION NO. : 13/364483
DATED           : December 20, 2016
INVENTOR(S)     : Petri Piippo, Sampo T. Vaittinen and Juha H. Arrasvuori It is certified that error appears in the above-identified patent and that said Letters Patent is hereby corrected as shown below:

In the Claims

In Claim 1:
Column 10, Line 62, "an input" should be deleted and --a user input-- should be inserted.
Column 10, Line 64, "a first" should be deleted and --the first-- should be inserted.
Column 10, Line 66, "a target" should be deleted and --the target-- should be inserted.
Column 11, Line 5, "a second" should be deleted and --the second-- should be inserted.

In Claim 3:
Column 11, Line 23, "the current" should be deleted and --a current-- should be inserted.

In Claim 6:
Column 11, Line 39, "first marker" should be deleted and --first guidance marker-- should be inserted.

In Claim 10:
Column 11, Line 65, "second marker" should be deleted and --second guidance marker-- should be inserted.

In Claim 11:
Column 12, Line 6, "an input" should be deleted and --a user input-- should be inserted.
Column 12, Line 15, "geographic" should be deleted and --generated-- should be inserted.
Column 12, Line 16, "and bearing" should be deleted and --and the bearing-- should be inserted.

In Claim 20:
Column 13, Line 33, "first marker" should be deleted and --first guidance marker-- should be inserted.

In Claim 21:
Column 13, Lines 42-43, "displaying a second virtual view in the first user equipment;" should be deleted.

Signed and Sealed this
Twenty-eighth Day of February, 2017

Michelle K. Lee
*Director of the United States Patent and Trademark Office*

CERTIFICATE OF CORRECTION (continued)
U.S. Pat. No. 9,525,964 B2

In Claim 29:

Column 14, Line 52, "first marker" should be deleted and --first guidance marker-- should be inserted.
Column 14, Line 56, "second marker" should be deleted and --second guidance marker-- should be inserted.